June 20, 1972 G. GROH 3,671,106
OPTICAL MULTIPLEX FILTER SYSTEM
Filed Sept. 8, 1970
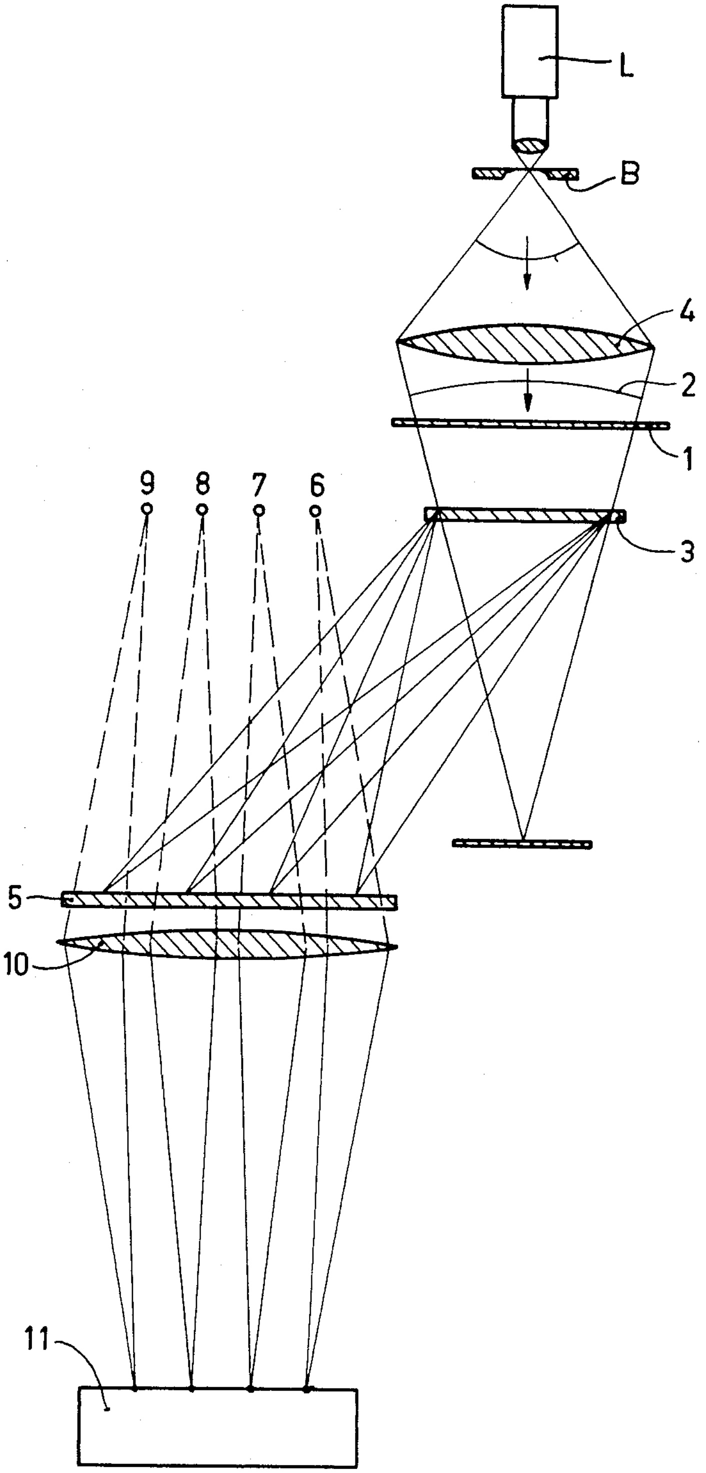
INVENTOR.
GUNTHER GROH
BY [signature]
AGENT

United States Patent Office 3,671,106

Patented June 20, 1972

3,671,106

OPTICAL MULTIPLEX FILTER SYSTEM

Gunther Groh, Hamburg, Germany, assignor to U.S. Philips Corporation, New York, N.Y.

Filed Sept. 8, 1970, Ser. No. 70,339

Claims priority, application Germany, Sept. 5, 1969, P 19 45 085.2

Int. Cl. G02b *5/18*

U.S. Cl. 350—162 SF 10 Claims

ABSTRACT OF THE DISCLOSURE

A character recognition apparatus uses a holographic image multiplier to project an observed image in angularly separated beams. In the path of each beam an optical spatial filter is placed. By virtue of the image multiplication the shape of the observed character may be simultaneously processed.

The invention relates to an optical multiplex filter system for optical data-processing. The invention has for its object to distribute data over a large number of parallel transmission channels in which the data passes through optical filters which process the data in a described manner or convert them into a code suitable for practical application. These differently processed data can then either be handled in a parallel process or be combined to a new signal which is given by the sum of these data.

One of the most important applications of optical filter systems is character recognition, in which, for example, letters, numbers, fingerprints or image details must be automatically identified and converted into suitably coded signals. These signals can then be applied to a computer for further processing. Furthermore, a plurality of methods and arrangements are known for achieving this end. All these methods have in common that one filter can search for only one character. Since consequently reading of letters of various print types requires a separate filter for each variant, a large number of filters must be tried out for each individual case until the letters to be read has been identified. In order to shorten the time required for these operations, in a known arrangement (D. Gabor: Character Recognition by Holography, Nature 208 (1965) 422–423), a large number of filter functions are superimposed on one photographic plate in the form of holograms. The essential variants of a character (a letter) are stored in each separate hologram in the form of the spatial Fourier spectra thereof. Since coded reference sources are employed for recording these holograms, the filtering process gives rise to corresponding light distributions in the plane of the detector which can be associated with the separate letters. A disadvantage of this method results from the fact that due to the small control range of photographic materials only a limited number of holograms can be superimposed. This is particularly unfavorable in holograms of spatial Fourier spectra, the very strong and deep spatial frequencies of which generally already result in a strong over-exposure of the photographic materials. Since moreover the limitation to given gradiation ranges, for example, in the manufacture of inverse filters or of low-noise filters, involves great difficulty already for separate filter functions, superimposition of a large number of filters is found to be hardly possible.

These disadvantages of known arrangements are avoided in accordance with the invention by providing in one of the optical filter arrangements behind the data carrier a pupil multiplier which produces a number of wave fronts having different directions of propagation and which distributes the data over a large number of channels. Each channel includes spatially separated optical filters which process the data or convert these data into suitably coded signals.

The optical data to be processed are consequently multiplied in a parallel process and supplied to a large number of optical transmission channels which each include spatially separated optical filters. The results of these filtering processes are then optically or electronically summed and further processed.

The figure of the drawing shows a preferred embodiment. In this case, it is assumed for the sake of simplicity that the image pattern 1 to be examined (for example, a form on which numbers and letters are read automatically) is available in the form of a transparency. The spatial Fourier spectrum of this transparency is projected in known manner by exposure to a converging spherical wave 2. For this purpose, there is provided a light source L having a diaphragm B. Contrary to the known arrangements, an optical component is arranged behind the transparent object 1, which component acts as exit pupil of the first transformation lens 4 and at the same time represents the superimposition of a large number of pupil functions which differ from each other mainly by the directions of propagation of the associated wave fronts. In the present embodiment, this component 3 is constituted by a known point hologram as is used, for example, in multiple-imaging arrangements. By means of this pupil multiplier 3, which produces a number of wave fronts having different directions of propagation, a large number of spatially separated Fourier spectra of the image pattern 1 are projected in the plane of the filter 5. These spectra are identical to each other but for one phase factor. Each of these spectra is incident at this area on an element of a matrix of optical filters 5, which have been separately manufactured with the use of known holographic methods. Consequently, upon exposure to the Fourier spectrum of the unknown optical data, each filter produces the virtual image 6, 7, 8 or 9 of the associated reference source. Mathematically speaking, its amplitude function is convolute with the cross-correlation function of the detail searched for in the relevant channel and of the total amount of data to be processed. By means of the lens 10, these virtual images are projected onto a photoelectric detector 11 and converted in this detector into electric signals for further processing.

The advantages of this arrangement will be described with reference to a few examples, which could be realized with the aid of conventional arrangements only at the expense of a large amount of time and expensive apparatus.

In general, only the maximum amplitude of the cross-correlation function is detected, which with given characters gives rise to a major problem in the automatic character recognition. The letter "p" comprises, for example, structural elements which are related to the letters "o" and "l." In order to guarantee unambiguity, a filter hologram could be made of each of the structural elements "o" and "l," respectively. In this case, the letter "p" would be present only if the two filter outputs supply the same signal. In this case, ambiguity would still subsist as far as the letters "b" and "d" also comprise the same structural elements.

According to the invention, this difficulty can be avoided by adding the filter signals optically together. For this purpose, in recording the filter holograms, the reference sources are relatively displaced in distance and in direction exactly by an amount corresponding, for example, for the letter "p" to the relative positions of the centers of the auto-correlation functions of the structural elements "o" and "l." The filter signals then coincide in the plane of the detector only if the object is a "p," whereas they are located beside each other with the letters "b" and "d." These different possibilities can be distinguished from each other by amplitude discrimination of the detector signal.

A problem, which can be solved in a very simple manner by the use of the arrangement according to the invention, arises when the presence of one or more of a large number of different details in an image pattern must be ascertained, as is the case, for example, when a series of X-ray images or aerial images are pre-filtered. In this case, the filter holograms are composed with the use of one reference source common to all these holograms; for the filter signals in the plane of the detector are then optically added together, a signal being obtained at every point at which one of the various details searched for is present in the image pattern. Since but for a scale variation, if any, the position of these signals accurately corresponds to that of the details searched for, the signal plane and the image pattern can be readily projected onto each other with the aid of means used in optics or in television technology in order to facilitate the ultimate filtering.

Of course, scale variations in the image pattern and rotations can be taken into account in the usual manner when in the said arrangements the space between the first transformation lens 4 and the pupil multiplier 3 is chosen to be sufficiently large to permit a displacement of the image pattern 1 along the optical axis and a rotation of this image pattern about this axis.

The arrangement according to the invention further has the advantage that the transmission capacity of the system in the filter plane can be utilized more satisfactorily. For in many cases, the usable part of the filter function is limited to a small area in the filter plane. The arrangement described affords the possibility of covering the overall surface area available with identical filters which are each controlled by the same data. When the filtered signals are optically added together, an improvement of the signal-to-noise ratio is obtained.

In such arrangements, in which several signals must be optically added together, it is often efficient for the wave fronts to be superimposed incoherently in order to prevent destructive interference. According to the invention, this can be achieved in that each of the spatially separated transmission channels is provided with a modulator which modulates the phase of the light so that it is constant in space but exhibits statistic fluctuations in time with respect to the phases in all the remaining channels. Such phase modulations may be obtained, for example, by means of discs consisting of electro-optically active materials and having a size equal to that of the filters, which are controlled by relatively independent noise signals.

As these examples given by way of illustration can represent only a selection of the number of possible applications, a series of variants of the arrangement shown in the figure are possible which are clear to those skilled in the art and fall within the scope of the invention. For example, the pupil multiplier may be constituted by a system of sequentially arranged prisms consisting of a birefringent material, as is known for other purposes. Rasterlike bending structures which modulate the amplitude or the phase of the light in space may be used for the same purpose. The separate filter channels may be also differently proportioned by using, for example, as pupils point holograms which are recorded by point light sources of different intensity. Furthermore, each channel may be provided with an individual imaging lens in that the lens 10 is constructed, for example, as a facet lens.

Moreover, the arrangement is of course not limited to filter holograms in which Fourier transformations are stored. Non-holographic filtering processes may also be carried out with the arrangement according to the invention.

What is claimed is:

1. An optical multiplex filter for processing information contained on a light emitting data carrier, comprising a pupil multiplier in the path of the light from the data carrier for producing a plurality of information carrying wave fronts having different directions of propagation whereby the information is divided into a plurality of spatially separated channels, and an optical filter in each of the spatially separated channels for processing the information in each channel.

2. Filter system as claimed in claim 1, characterized in that a point hologram acts as pupil multiplier.

3. A filter system as claimed in claim 1, characterized in that the pupil multiplier is constituted by a system of sequentially arranged prisms consisting of double-refringent material.

4. A filter system as claimed in claim 1, characterized in that a rasterlike bending structure, which modulates in space the phase or the amplitude of the light, acts as pupil multiplier.

5. A filter system as claimed in claim 1, characterized in that each of the transmission channels obtained includes a filter hologram which converts the data into the image of a suitably coded reference source.

6. A filter system as claimed in claim 5, characterized in that the images of a few coded reference sources coincide in space when given details occur simultaneously in the image pattern to be processed in a pre-determined order of succession.

7. A filter system as claimed in claim 5, characterized in that the images of the coded reference sources coincide and their positions indicate the positions of the details searched for in the various channels.

8. A filter system as claimed in claim 7, characterized in that the images of the coded reference sources are superimposed to scale with the aid of means used in optics or in television technology.

9. A filter system as claimed in claim 1, characterized in that several of the relatively separated transmission channels include identical filters, the output signals of which are superimposed.

10. A filter system as claimed in claim 1, characterized in that each of the spatially separated transmission channels includes a modulator which modulates the phase of the light so that in space it is constant but in time it exhibits statistic fluctuations with respect to the phases in all the remaining channels.

References Cited

UNITED STATES PATENTS 3,572,878 3/1971 Lu ---------------- 350—3.5

OTHER REFERENCES

Vitols, 8, IBM Tech Disc. Bulletin, 1581–1583 (April 1966).

Garbor, 208, Nature, 422–423 (October 1965).

Tait et al.: 11, IBM Tech. Disc. Bulletin, 1636 (May 1969).

Leith et al.: 74, Journal of the SMPTE, 893–896 (October 1965).

DAVID SCHONBERG, Primary Examiner

R. L. SHERMAN, Assistant Examiner

U.S. Cl. X.R.

350—3.5